[11] 3,569,619

[72] Inventor Luther G. Simjian
    Laurel Lane, Greenwich, Conn. 06830
[21] Appl. No. 740,666
[22] Filed June 27, 1968
[45] Patented Mar. 9, 1971

[54] VERIFICATION SYSTEM USING CODED IDENTIFYING AND STORAGE MEANS
3 Claims, 6 Drawing Figs.

[52] U.S. Cl.................................................. 178/6.8,
                                                 179/2, 340/149
[51] Int. Cl.................................................. H04n 7/18
[50] Field of Search....................................... 178/6
       (IND), 6.8; 179/2 (CA); 179/2; 340/149, 324.1

[56] References Cited
UNITED STATES PATENTS

| | | | |
|---|---|---|---|
| 2,914,746 | 11/1959 | James............................ | 340/149 |
| 2,923,921 | 2/1960 | Shapin, Jr...................... | 340/174 |
| 2,994,740 | 8/1961 | Conkwright et al. ......... | 178/6 |
| 3,050,579 | 8/1962 | Nash et al...................... | 178/5.6 |
| 3,387,084 | 6/1968 | Hine et al. ..................... | 178/6.8 |
| 3,394,246 | 7/1968 | Goldman....................... | 340/149A |

OTHER REFERENCES
I.B.M. Technical Disclosure Bulletin Vol. 8 No. 11 April 1966 Page 1491 Copy in 179-2 CA

*Primary Examiner*—Robert L. Griffin
*Assistant Examiner*—Richard K. Eckert, Jr.
*Attorney*—Ervin B. Steinberg ABSTRACT: A verification system for identifying means such as credit cards, charge plates, etc. includes a storage means storing an image of the rightful possessor of such card or characters from which such an image can be reproduced. Responsive to the presentation of such a card and insertion thereof in a sensing means, a display device coupled to the storage means provides a display of a respective image. A clerk is able to compare the appearance of the card bearer with the display and thereby verify whether the bearer and the identifying means are in agreement or whether submission of additional evidence is required.

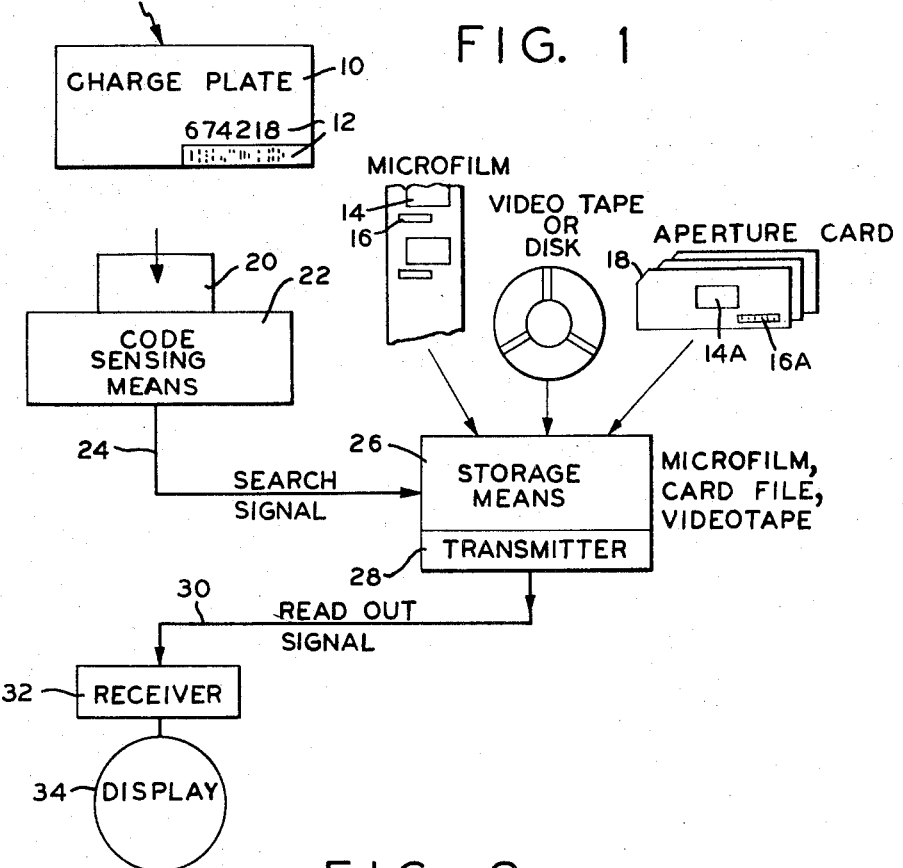
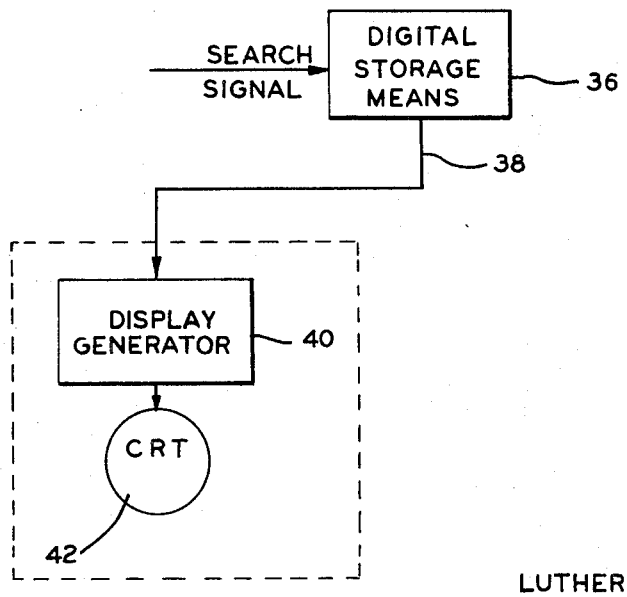

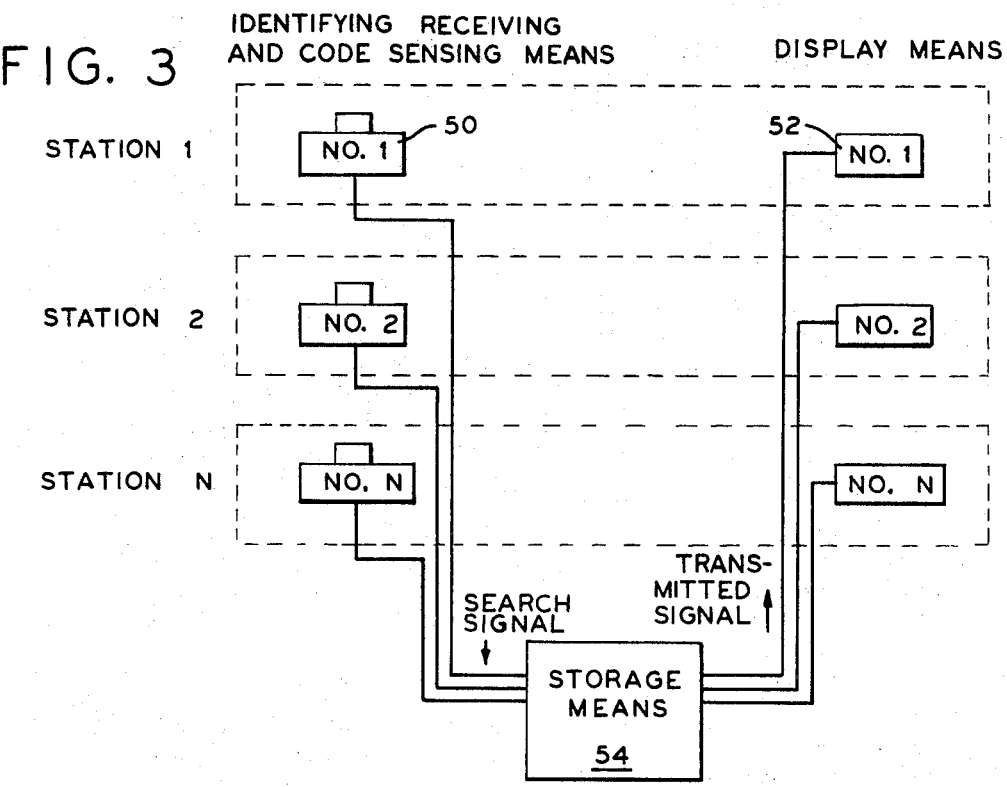
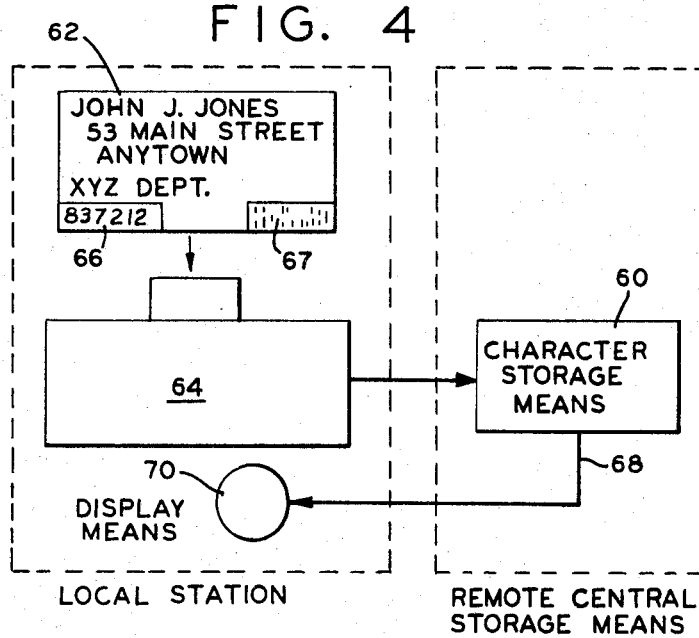

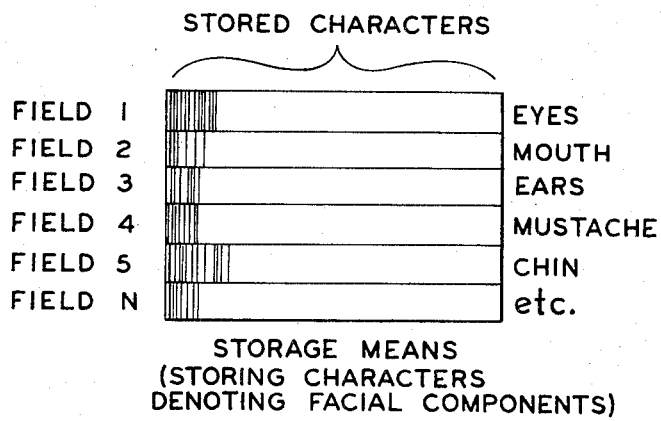
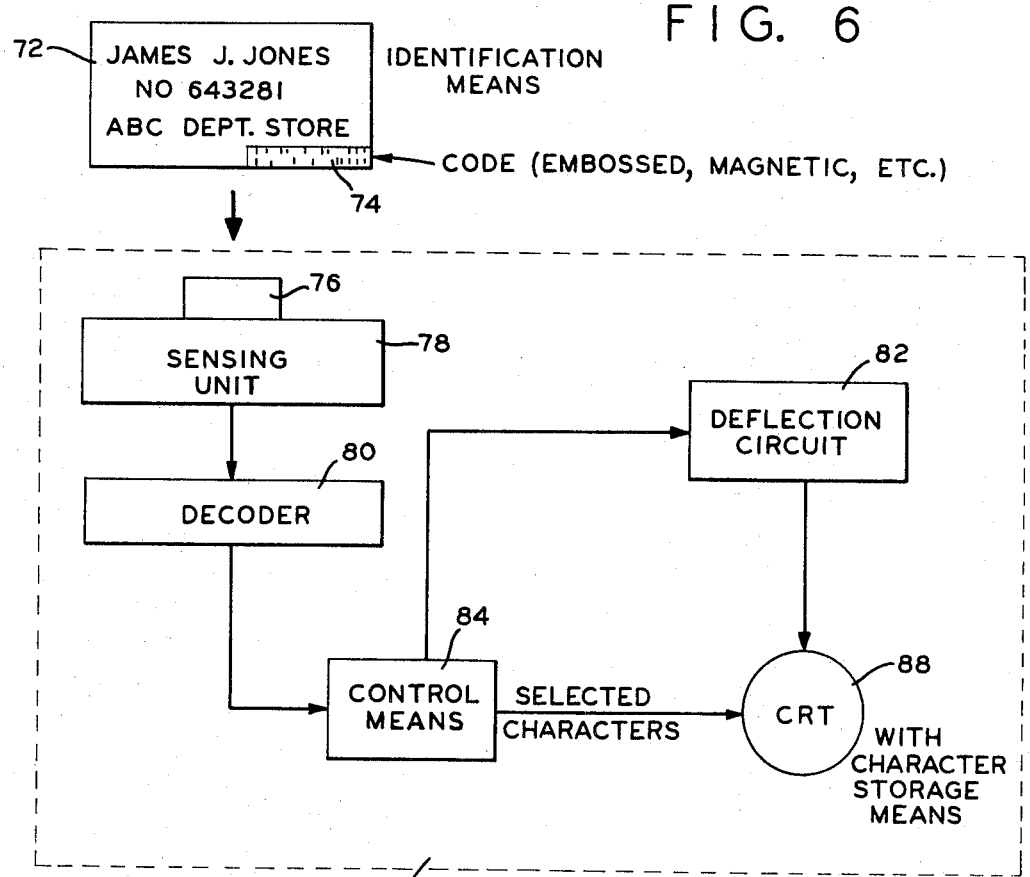

VERIFICATION SYSTEM USING CODED IDENTIFYING AND STORAGE MEANS

This invention refers to a verification system and, more specifically, refers to a system for verifying the bearer of a credit card or of a charge plate. Quite specifically, this invention refers to a system for more accurately verifying that the bearer of a charge plate or credit card is actually the person entitled to possess and present such a card or plate.

The use of credit cards and charge plates is a well established and accepted practice. While certain precautions are taken, such as signature identification, it still occurs that a credit card is lost and that the finder or possessor of a particular credit card which has been obtained surreptitiously charges large expenditures against such a card until the particular person is apprehended or payment against a particular credit card is stopped. A great deal of effort is expended in preventing such occurrences, yet thousands if not millions of dollars are annually lost by fraudulent charges. Countless other millions of dollars are spent in fraud prevention and in tracking down individuals who unlawfully use credit cards which have been found or stolen.

The present invention attempts to overcome this problem by providing a storage means which includes in one embodiment an image of the rightful cardholder, such as a photograph of the face. In another embodiment the storage means includes a character storage device for storing a set of standardized traits peculiar to persons, such as the appearances and shapes of nose, eyes, mouth, ears, etc. When a card is issued to a person either the photograph is inserted into the storage device or the appropriate characters are assigned to the issued card. Such assigning is accomplished either by special code means on the card itself or by means of the regular account number. A member of the group of establishments honoring such a credit card is provided with a means for receiving such a card, sensing the appropriate code means on the card and in response thereto displaying an image which permits a comparison to be made with the person presenting such a card. In a further embodiment a clerk or attendant gains access to the storage means by transmitting a signal which causes a display to appear on the display means provided.

One of the principal objects of this invention, therefore, is the provision of a new and improved verification system suited for charge plates and credit cards.

Another important object of this invention is the provision of a verification system for use in connection with charge plates and credit cards for more accurately verifying the authenticity of a presented card, specifically, for verifying that the person presenting a particular card is actually the lawful possessor of such evidence.

Another important object of this invention is a system for reducing fraud arising from the widespread use of credit cards and charge plates.

Another object of this invention is the provision of an identification card which is coded for access to a storage means containing information of the visual appearance of the lawful possessor of the card and a means for providing a display of the stored information responsive to the presentation of such card.

A further object of this invention is the provision of a new and novel system for verifying the correctness of presented credentials and making fraudulent use of such credentials more difficult.

Further and still other objects of this invention will be more clearly apparent by reference to the following description when taken in conjunction with the accompanying drawings in which:

FIG. 1 is a schematic block diagram of a typical embodiment of my invention;

FIG. 2 is a schematic block diagram of a variation of the arrangement per FIG. 1;

FIG. 3 is a block diagram of an embodiment of my invention when a plurality of stations are used;

FIG. 4 is a schematic block diagram of a further embodiment;

FIG. 5 is a schematic diagram showing a storage means using predetermined standardized characters; and FIG. 6 is a block diagram of another embodiment of my invention.

Referring now to the FIGS. and FIG. 1 in particular, a typical embodiment of my invention is indicated.

Numeral 10 identifies a typical charge plate or a credit card which is provided with an account number, numeral 12, which is assigned to the person requesting the particular card. At the time an application is made for the issuance of such a credit card or charge plate, the person is requested to furnish a photograph of himself or the person must present himself at a particular location where such a photograph is made. As is known, the facial appearance is of particular interest. Such a photograph then is processed and, in typical embodiments, is provided upon a microfilm as indicated by numeral 14 and assigned a code number 16 which associates the picture with the account number 12. Alternatively, the photograph may be mounted on an aperture card 18 as indicated by the film insert 14A and the card coded with a number 16A which, as stated before, refers to the account numeral 12. The account number applied to the charge plate may be either in the form of visible characters or may comprise code means either visible or invisible, such as magnetic code, but it will be necessary that the account or code means 12 of an identification means 10 is correlated with the respective images 14, 14A by the code means 16, 16A applied to the microfilm, aperture card or other suitable storage devices such as videotape, or magnetic storage discs.

When a charge plate 10 of the type identified above is presented at an establishment, for instance, in a department store, and the clerk wishes to verify the correctness of the bearer, the charge plate is inserted by the clerk into a receiving means 20 which is connected to a code sensing means 22 adapted to sense the code 12 on the charge plate. As a result of this, a search signal is sent via a conductor 24 to the data storage means 26. Control means (not shown) associated with the storage means now search for correlation between the code 12 and the code 16 or 16A of the stored information and when the appropriate image has been found it is scanned by a transmitter 28 which via conductor 30 transmits the image to the receiver 32 for display by a display means 34. Therefore, the display means 34 will display data from the storage means, particularly the appearance of the person as originally supplied, and the clerk may verify whether the card bearer is the person whose image has been stored previously. Transmission of the picture between the transmitter 28 and the receiver 32 advantageously is accomplished by closed circuit means, such as closed circuit television or the arrangement known as Picture-Phone developed by the Bell Telephone System.

FIG. 2 shows a variation of the arrangement in FIG. 1. Instead of providing a photographic image, a digital storage means 36 is provided which is connected via conductor 38 to a display generator 40 which provides an image on the cathode ray tube 42. The generation of characters on a cathode ray tube by means of a display generator which is coupled to digital storage means is well known in the art, see for instance the article, "Family of Computer-Controlled CRT Graphic Displays" by Carl Macchover, Information Display magazine, July/Aug. 1966, or in the article, "Converting Data to Human-Interpretable Form," same author, Data Systems Design magazine, Sept. 1964. In the embodiment per FIG. 2, the photograph of the person applying for the credit card is scanned electronically and then stored in digital information, the account number providing access to the stored information.

FIG. 3 is a block diagram of an arrangement indicating in block form a plurality of identifying receiving and code sensing means with associated display means, all connected to a single central storage means. This type of arrangement is necessary for connecting a plurality of establishments to a central storage means. As seen, Station 1 is provided with identifying receiving and code sensing means 50 and a display means 52. Station 2 is provided with a similar set of identifying receiving and code sensing means and a display means. This arrangement is repeated at each of the stations provided. All stations are coupled to the central storage means 54 which provides the appropriate display at the display means responsive to the receipt of the search signal.

It will be appreciated that in an arrangement per FIG. 3, search signals from a plurality of stations may be received substantially simultaneously and that these signals must be processed either in sequence or by multiplexing or time-sharing techniques within the storage means. Most conveniently, however, the search signals can be processed sequentially, the proper information found in file and then transmitted to the respective display means. Since the display means may be required to display the information for some length of time, the cathode ray tube at the display means preferably is a storage tube which maintains the received information until the information displayed is erased locally. Therefore, a large number of sequential searches can be accomplished within the storage means without necessity to repeat cyclically the readout from the storage means.

A further embodiment of my invention comprises the utilization of standardized stored graphic representations of facial appearance or traits of a person, such as is used in police work where there are available tables illustrating the appearance of the eyes, of the nose, mouth, mustache, hairline, chin, etc. Based on the selection of the proper representations or characters, it is possible to provide a composite picture of the appearance of a person. In this type of embodiment, see FIG. 4, a character storage means 60 is provided with these standard characters as available from the tables noted above. The storage may be accomplished by digital storage means, optical means, or other suitable means. The credit card 62 is again inserted into the receiving means and the decoding means 64 sends the appropriate signal, corresponding to the account code 66, to the character storage means 60. The character storage means 60 has previously been coded to associate certain selected standard characters (representations) with the respective account code 66. The appropriate characters are sensed responsive to the search signal and transmitted via conductor 68 to the display means 70. The display means 70 in turn provides a composite representation of the appearance of the face, using in this case, however, an assemblage of individual characters selected from storage. It will be apparent that in this embodiment the character storage means 60 becomes relatively small and a much more rapid selection is obtained. Instead of associating the account code 66 with certain appropriate characters stored in the character storage means, it is possible to provide the identifying means 62 directly with appropriate code means 67 which immediately cause the selection of the appropriate characters within the storage means 60. Coding of the identification means for proper character selection from the storage means must be done by a person skilled in the art. Either a person must be present when such coding is accomplished, or a photograph must be available or mailed with the application when issuance of an identification means 62 is requested.

The advantage derived by the arrangement of per FIG. 4 is illustrated more clearly in FIG. 5 which shows, in block form, the arrangement of the storage means which is divided to contain fields of stored characters pertaining to eyes, mouth, ears, mustache, chin, etc. Each filed then is subdivided once again to contain the various standardized characters associated with the shapes of eyes, mouth, etc. In this manner the storage means can be prefabricated and remain constant whereas only the credit card issued must be suitably coded in order to provide a readout of the appropriate characters. While it will be advantageous to store the necessary information in digital form using the techniques indicated heretofore, it may be suitable also, particularly in smaller installations, to store the information in optical form, such as positive or negative prints or transparencies, read the selected characters by means of optical scanning means and then transmit this information to the display means using wire transmission.

FIG. 6 shows a further variation which is particularly suited when the centralized storage means or a large central digital storage means is to be avoided. As shown in FIG. 6, numeral 72 shows an identification means which in block 74 is coded to contain the information characters as to the facial appearance of the bearer. This coding, of course, must take place at the time of the issuance of the identification means and the code means 74 refers to certain selected standard characters providing the appearance of the eyes, shape of the nose, shape of the mouth, presence or absence of a mustache, shape of mustache, hairline, etc. Upon presentation, this identifying means 72 is inserted in a receiving means 76 which is coupled to a code sensing means 78. A decoder 80 is connected to the code sensing unit 78 and this decoding means sends a signal to a control means 84 which is coupled to a cathode ray tube 88 and to a deflection circuit 82 for causing proper beam deflection in the cathode ray tube 88. The cathode ray tube is a tube of the type known as "Charactron" which has an aperture or stencil mask. The aperture mask has small apertures, each aperture forming a stored character and therefore, in the present case, the mask is provided with small apertured apertures having the shape of the characters pertaining to facial appearance as indicated in connection with FIG. 5. By means of the deflection circuit 82 the electron beam is sent through selected apertures (beam shaping technique) and the appropriate characters are then suitably arranged on the face of the cathode ray tube to produce a composite picture.

Due to the fact that a standardized character storage means is used and that the character selection is accomplished directly by the identification means, the sensing unit 78, the decoder 80, the control means 84, the deflection circuit 82 and the display means 88 can be packaged in a small, self-contained unit 90 and provided at each of the identification means receiving stations, such as the various sales counters in a department store. Instead of a shaped beam device, such as the "Charactron" tube indicated heretofore, it should be understood, however, that a small digital storage means may be used where the components of facial appearance of person are stored in digital form and readout is made from such digital storage for display on a viewing screen.

Aside from the fact that the various storage means described heretofore, may either store the complete facial appearance of a person either in composite form or in component form and provide a composite assembly as has been described, it shall be understood that in addition other information may be stored, such as presence of scars, the appearance and shapes of scars, and that such information can be made available together with alphanumeric data as may be desired. In other instances it will be readily possible to present certain shapes, forms or characteristics of a person's handwriting and the bearer presenting the identification means may be required to write certain words or letters whose similarity or coincidence with the presented information can then be more closely compared and verified.

In other instances the arrangement described heretofore can be combined with a credit inquiry and the amount of balance in the account or the available credit can be displayed in association with the appearance or traits of the person.

A further modification which readily can be made is the omission of the code sensing means in the embodiments shown in FIGS. 1, 3 and 4 in those instances where the alphanumeric characters on the identifying means are sensed and transmitted as a search signal to the storage means. A clerk or attendant may visually read these characters and send respective signals generated responsive to the manipulation of a telephone dial, a pushbutton device or other manually operated input device to the storage means. The search for the stored characters, selection, readout, transmission and display will remain, however, as described previously.

In summary then I have disclosed certain arrangements which permit a verification of the bearer of a credit card whenever such a card is presented for the purchase of goods or services. The card is received and by means of code means on the card and previously stored information, certain traits relating to the appearance of the person are presented. The display may be either a complete or partial facial view of the person, obtained from a storage means by means of a search signal, or the view is a composite representation of individual standardized characters obtained from a storage means in response to the presentation of the identification means. Either the identification means itself is coded with the appropriate character or the account number of the issued identification means is associated with proper character selection means.

While I have described and illustrated certain preferred embodiments of my invention and certain modifications thereof, it will be apparent to those skilled in the art that various further changes and modifications may be made without deviating from the broad principle and intent of this invention.

I claim:

1. A verification system comprising:

storage means for storing characters denoting components of human facial features;

means for receiving an identification means provided with a code means related to respective ones of said characters;

sensing means coupled to said receiving means and to said storage means for sensing said code means and providing a respective code means responsive signal to said storage means for causing selection of respective characters from said storage means, and display means coupled to said storage means for displaying an image responsive to said selected characters whereby to display facial features.

2. A verification system comprising:

storage means for storing characters denoting components of human facial features;

a plurality of means for receiving an identification means provided with code means related to respective characters stored in said storage means;

sensing means associated with each of said receiving means and coupled to said storage means for sensing the code means responsive to the receipt of an identification means and providing a code means responsive signal to said storage means for causing selection of respective characters stored in said storage means; and a plurality of display means, one disposed in proximity to each of said means for receiving, coupled to said storage means for displaying an image responsive to said selected characters whereby to display certain facial features.

3. A verification system as set forth in claim 2, said display means including means for causing said selected characters when displayed to be arranged in the order of a human face.